Oct. 27, 1942.    R. L. SMITH    2,300,319
APPARATUS FOR CLEARING CLOGGED DRAINS
Filed Nov. 5, 1940
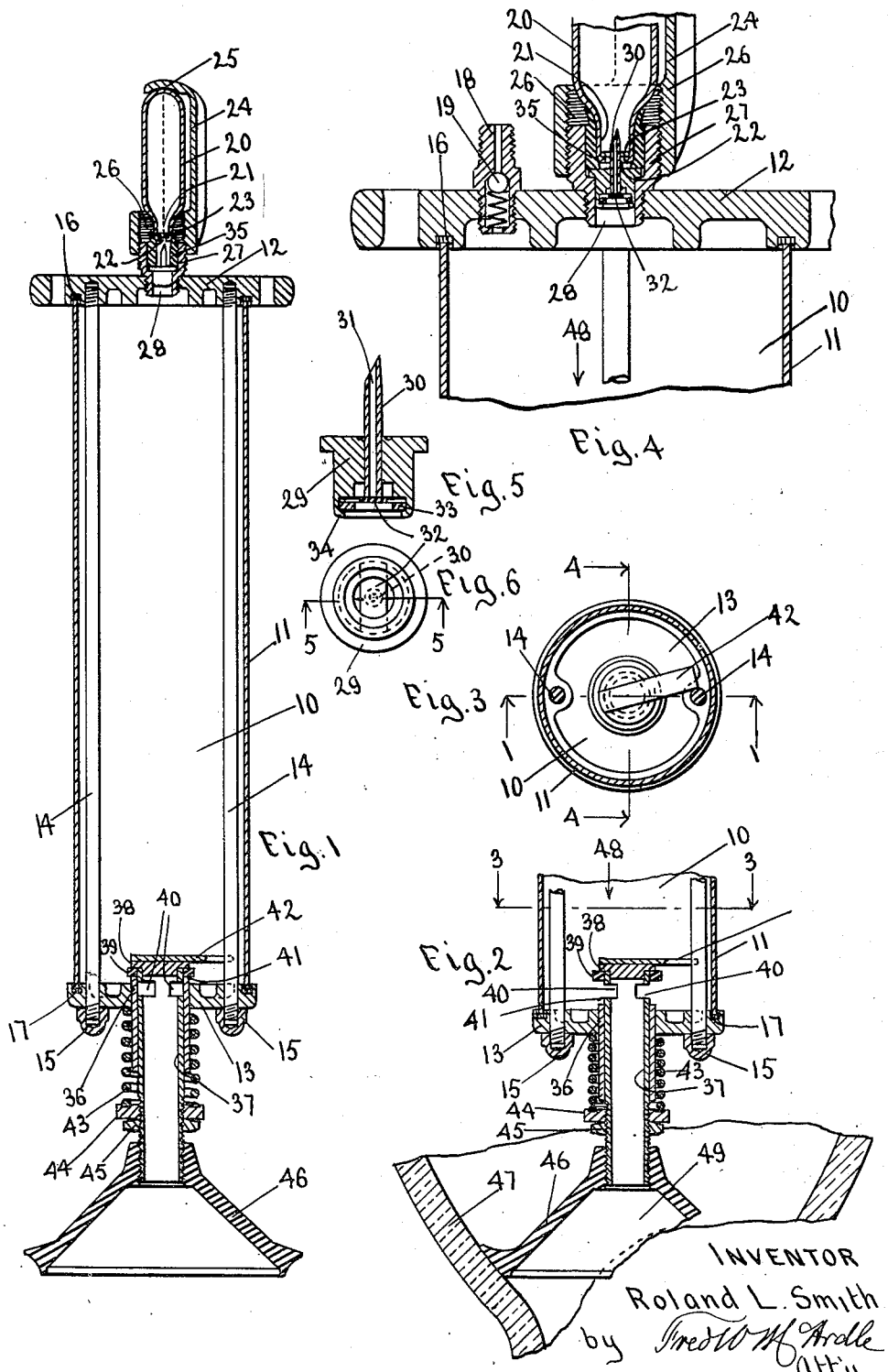
INVENTOR
Roland L. Smith
by Fred W. McArdle
Atty Patented Oct. 27, 1942

2,300,319

UNITED STATES PATENT OFFICE 2,300,319

APPARATUS FOR CLEARING CLOGGED DRAINS

Roland L. Smith, Belmont, Mass., assignor to Scully Signal Co., Cambridge, Mass., a corporation of Massachusetts Application November 5, 1940, Serial No. 364,399

4 Claims. (Cl. 4—255)

My invention relates to devices for clearing obstructions from drains, waste pipes and the like and particularly to the devices of this character in which air or gas under pressure is used for the purpose.

One of the objects of my invention is to provide a device of this character which may be operated by compressed air admitted to reservoir forming part of my device, or the charging may be done by the use of sealed containers of highly compressed gas such as carbon dioxide.

A second object is to provide a device of this character which is of simple construction, effective in action and economical in original cost and the cost of operation.

A further object is to provide a device of this character that may be readily disassembled for cleaning and lubrication by an unskilled operator.

My invention consists in the novel combination of elements and in the facility with which it may be effectively operated.

In the accompanying specification and claims, and the drawing forming a part thereof, I have described and illustrated one embodiment of my invention, but do not confine myself to the particular embodiment, as modifications may be made within the scope of the appended claims.

In the drawing,

Fig. 1 is a sectional elevation substantially on the line 1—1, Fig. 3.

Fig. 2 is a similar fragment showing the means for releasing the compressed gas into a toilet bowl outlet.

Fig. 3 is a cross section on the line 3—3, Fig. 2.

Fig. 4 is an enlarged sectional fragment on line 4—4, Fig. 3.

Fig. 5 is a further enlarged sectional elevation of the piercing element and holder on the line 5—5, Fig. 6.

Fig. 6 is an end view of the same.

Referring to the drawing:

The reservoir 10 preferably comprises the tube 11, with headers 12 and 13, connected by the stay rods 14, rigid with the header 12, and passing through the header 13, the nuts 15 clamping the tube 11 firmly between packing rigs 16, 17 recessed into respective headers and securing a gas tight joint.

When the device is to be used, this reservoir is charged with air or gas under pressure, and I have made provision for the use of either. In the header 12, I provide the nipple 18 which may be connected with a source of supply for compressed air, the ball 19 operating as a check valve to prevent escape of the compressed air or gas from the reservoir when it is charged.

I prefer however, to use a sealed container of highly compressed carbon dioxide, such as is commonly used for carbonating liquids and which is a commercial article.

This container comprises a shell 20 formed with a neck portion 21, in the end of which is a constricted outlet 22, sealed by the closure 23 of a character that may be pierced by suitable means such as I will presently describe.

For the use of this container with my device, I provide a holder element 24, socketed at 25, and tapped at its other end 26, to engage with the nipple 27 secured in the header 12. This nipple opens into the reservoir 10 at 28 and is counterbored to receive a member comprising the plug 29 in which is rigidly secured the piercing element 30 having a passage axially therethrough. The lower end of the plug 29 is counterbored, the piercing element end being flush with the counterbored surface, and a strip of rubber 32 is firmly held in the counterbore by the washer 33, the rubber covering the end of the piercing element and functioning as a check valve to admit gas to the reservoir, but to prevent escape therefrom when the container is removed. The walls of the counterbore are spun about the washer as at 34, securing the rubber firmly in position and permitting incoming gas to pass through the hole in the washer.

The plug 29 is secured in position in the nipple 27 by the rubber bushing 35, projecting above the nipple when assembled and forming a cushion for the neck end of the container, clearing the piercing element. When one of these containers is to be used, the holder element 24 is engaged with the threaded nipple 27, the neck end resting in the bushing 35 and the opposite end in engagement with the socket 25 as the holder is rotated, the neck is forced into the opening in the bushing and the closure engages the piercing element and is pierced releasing the compressed gas which passes through the passage 31 by the rubber check 32, and into the reservoir, the bushing 35 securing a tight joint about the neck of the container.

In this embodiment, I have shown the outlet from the reservoir through the header 13 as a preferable construction, and a valve of novel construction, operative to release the gas in the reservoir, by pressure on the reservoir in a direction to move the valve inwardly in an axial direction relative to the outlet. Rigid with the header 13, and extending through the outlet is a sleeve 36, forming a conduit and a bearing for the piston valve 37, slidable therein axially. This valve is in the form of a tube closed at its inner end by the cap 38, overlapping the periphery of the tube and serving as an abutment for the washer 39, preferably of rubber, and adapted to seat on the end 41 of the sleeve 36, adjacent to this washer, I have provided ports 40 extending through the wall of the tube 37, and when the washer is seated on the end of the sleeve, the ports are closed by the walls of the said sleeve, and the pressure in the reservoir operates on the cap, the washer functioning as additional means for preventing escape through the annular space about the valve member, necessary for clearance. To prevent free rotation of the valve member, I provide an arm 42, rigid with the cap 38 and extending outwardly to engage one of the stay rods 14. The valve member 37 projects outwardly from the sleeve 36 and is threaded a portion of such extension. Surrounding the member is a compression spring 43, the nut 44 and check nut 45 engaging the threaded portion of the member 36 and supplying means for adjustment of the tension axially on the cap 38 and washer 39. The pliable cup 46 is of the usual type used with devices of this character, and is secured at the end of the member 37 in the usual manner. When the reservoir is charged with gas under compression this pressure on the cap 38 is in addition to the tension on the spring, but as the ports are opened to the interior of the reservoir, the pressure of the gas is balanced and there is a quick movement inward of the valve member due to the balancing of the pressure, the tension being so adjusted on the spring that it may not be either excessive or less than necessary to cushion the movement of the valve member axially when in operation.

The operation of this device is indicated in Fig. 2 in which the cup 46 is shown in engagement with the toilet bowl 47 above its outlet. With the reservoir charged with compressed gas or air by means shown in Fig. 4, or by means of connections to a source of compressed air admitted through the check valve 18, the reservoir is pressed in the direction of the arrow 48, Figs. 2 and 4. As the bowl 47 acts as an abutment for the cup 46, when pressure is applied to the reservoir 10, it moves axially on the valve member 37 against the yielding resistance of the spring 43, operating to uncover the ports 40 and admitting the air or gas at full pressure into the tube and the interior 49 of the cup 46, and on the obstruction in the clogged pipe.

Having thus described my invention, I claim:

1. A device for clearing clogged drain pipes including in combination, a reservoir having an inlet and an outlet, a sealed container of compressed gas removably secured in the inlet, means for piercing the container to admit expanding gas to the reservoir, a closure to the outlet adapted to open when pressure is applied to the exterior of the reservoir in the direction axial with the outlet.

2. In a device of the character described in claim 1, the closure comprising a valve provided with means for exerting a yielding tension to retain the valve in closed position, such means being adjustable to vary the tension.

3. In a device of the character described in claim 1, the outlet of the reservoir being formed as a conduit, and the valve as a tubular element closed at one end and movable axially, one end being closed and the other end being provided with a pliable cup element secured thereto, the valve having ports through the wall thereof, normally closed by engaging the conduit, but adapted to connect with the interior of the reservoir when the reservoir is pressed from its exterior in the direction axial with the conduit.

4. A device for clearing clogged drain pipes including in combination a reservoir having an inlet and having an outlet at the bottom of said reservoir, a sealed container of compressed gas removably secured in the inlet, means for piercing the container to admit expanding gas to the reservoir and an openable closure for said outlet.

ROLAND L. SMITH.